United States Patent
Clemens

[11] Patent Number: 5,810,896
[45] Date of Patent: Sep. 22, 1998

[54] AIR FILTRATION AND PURIFICATION SYSTEM FOR VEHICLE

[76] Inventor: Mark Clemens, 485 Beaumont Dr., Vista, Calif. 92084

[21] Appl. No.: 895,490

[22] Filed: Jul. 16, 1997

[51] Int. Cl.⁶ .................................................. B01D 46/10
[52] U.S. Cl. .............................. 55/385.3; 55/471; 55/473; 55/482; 96/134; 96/147
[58] Field of Search .................................. 55/385.3, 471, 55/473, 499, 501, 482; 96/134, 147; 454/156, 158

[56] References Cited

U.S. PATENT DOCUMENTS

| | | | |
|---|---|---|---|
| 2,804,756 | 9/1957 | Faulhaber et al. | 55/385.3 |
| 5,042,603 | 8/1991 | Olson | 55/385.3 |
| 5,147,430 | 9/1992 | Kidd | 55/385.3 |
| 5,221,292 | 6/1993 | Aoyama | 55/385.3 |
| 5,251,712 | 10/1993 | Hayashi et al. | 55/385.3 |
| 5,350,444 | 9/1994 | Gould et al. | 55/385.3 |
| 5,358,442 | 10/1994 | Ekinci | 55/385.3 |
| 5,423,903 | 6/1995 | Schmitz et al. | 55/385.3 |
| 5,433,772 | 7/1995 | Sikora | 55/385.3 |
| 5,613,991 | 3/1997 | Esaki et al. | 55/385.3 |
| 5,683,478 | 11/1997 | Anonychuk | 55/385.3 |

*Primary Examiner*—Jay H. Woo
*Assistant Examiner*—Minh-Chau T. Pham
*Attorney, Agent, or Firm*—John J. Murphey

[57] ABSTRACT

An air filtration and purification system for the interior of a closed vehicle, including an outside air intake and an inside air intake, both the intakes empty into a common plenum located interior of the vehicle, an air passageway defined by an inlet, in fluid communication with the plenum, and an outlet spaced-apart therefrom for removing the air in the plenum, a plurality of purifying air filters arranged in series in the passageway, a first air movement device interposed the plenum and said passageway inlet to create a flow of air from the plenum to the filters, a second air movement device in the outlet of the passageway to draw said flow of air across the filters, and a vent device in fluid communication with the second air movement device for distributing the filtered air from the second air movement device into the vehicle.

20 Claims, 3 Drawing Sheets

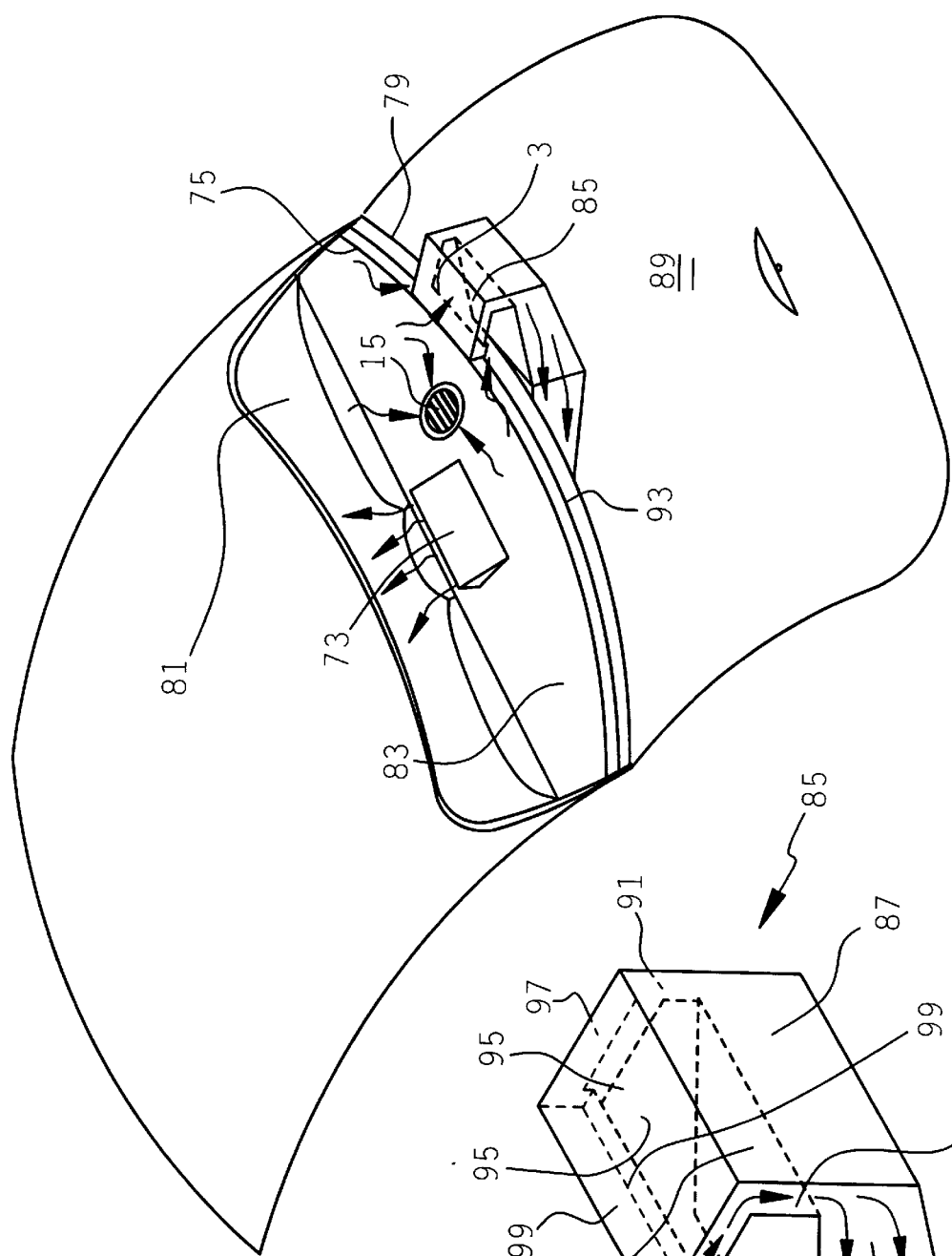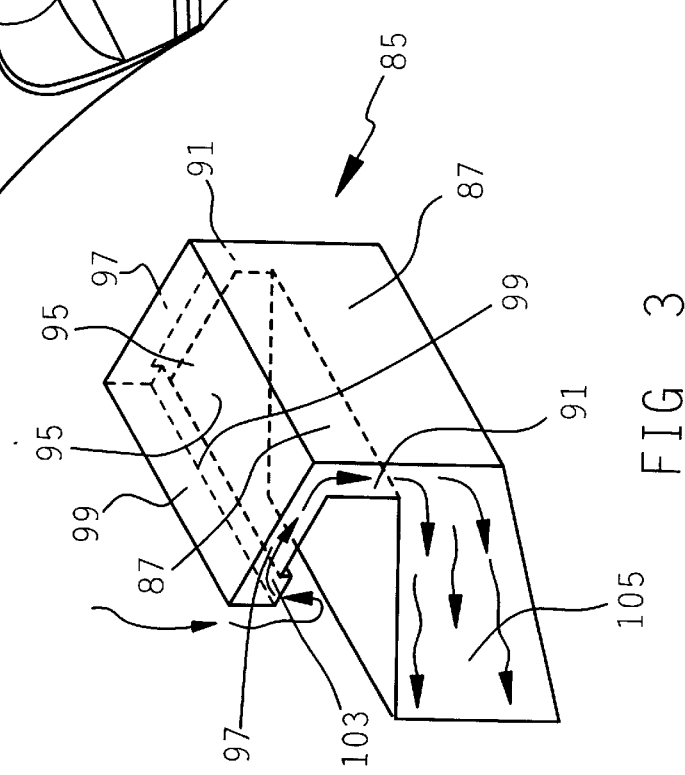

AIR FILTRATION AND PURIFICATION SYSTEM FOR VEHICLE

BACKGROUND OF THE INVENTION

1. Field of the Invention

This invention pertains to the field of air purification systems. More particularly, it pertains to a novel air filtration and purification system mounted in the interior of a closed vehicle for providing clean, fresh air to the interior thereof and simultaneously preventing the influx of pollutants from outside the vehicle.

2. Description of the Prior Art

The quality of one's life depends in large part upon the quality of the elements one faces from day-to-day. Drinking impure water will make one sick, working in an uncomfortable temperature/humidity can reduce one's efficiency, and breathing dirty air will eventually cause lung and other diseases.

For instance, almost every modern automobile's heating, air conditioning, and venting system is equipped to either bring in outside air or recirculate the passenger compartment air. When operating in the recirculating mode no outside air enters into the passenger compartment. However, due to the respiration of the vehicles' occupants, carbon dioxide levels will rise to unhealthy concentrations [greater than 1800 parts per million] inside the vehicle's passenger compartment. Automobile manufactures recommend against operating an automobile in the recirculating mode, with the windows up, because of the buildup of "stale air." When the vehicle is in the outside air intake mode, outside unfiltered air at 300–400 p.p.m. of carbon dioxide keeps the carbon dioxide level low. However outside air quality along roadways can be unhealthy. California's South Coast Air Quality District's 1989 study discloses that the air inside a vehicle's passenger compartment driving in Southern California, contains two to four times more cancer causing chemicals, including benzene, xylene, toluene and formaldehyde, that the outside air. The study states the cause of these high concentrations is pollutants flowing into the passenger compartment from smog and exhaust from traffic.

The present invention filters the particulate pollutants and the hydrocarbons, like benzene, from the outside air before the air enters the passenger compartment. The introduction of the filtered outside air also keeps the carbon dioxide levels below 1800 parts per million thus providing good air quality inside the passenger compartment.

To achieve a goal of having outside filtered air introduced into the passenger compartment without an unsightly and impractical outside air inlet port, i.e., in a window opening or cutting an opening into the vehicle's body, the present invention has the outside air inlet scoop located underneath the vehicle's trunk lid. The scoop is of low enough profile to be located between the trunk lid and over the weather-stripping edge rimming the trunk opening.

Modern automobiles use thick weather-stripping to seal the trunk lid to the vehicles body. Commonly there is a half inch gap between the two metal surfaces, when the trunk lid is closed. The half inch gap being sealed with soft foam weather-stripping, over which the scoop is located.

A secondary fan inducts, through the narrow inlet scoop opening, enough outside air, i.e., 15 cubic feet per person, depending upon fan speed, to maintain safe carbon dioxide levels inside the vehicle.

The prior art has attempted to provide outside air inlets located in various areas of the vehicle, such as on the body or roof of the vehicle, however, this would require cutting into vehicle's body, and weatherproofing the opening. Efforts have also been made to locate filters behind the rear wheel, however, when traveling on a dusty road, these filters would quickly clog.

SUMMARY OF THE INVENTION

This invention is an air filtration and purification system for the interior of a closed vehicle that overcomes the problems set forth above of the prior art. There is provided an air circulation system that utilizes a flow of fresh incoming air through an intake duct that may be attached to the vehicle without any damage done to the surface of the covering or to the windows and trim. The incoming air duct is designed in an extremely low profile that does not detract from the overall aesthetic appearance of the vehicle's design. A series or plurality of air filtration and purification devices are set in series in an air passageway of a unique design wherein an air movement means, generally in the form of a fan, is provided at both ends of the passageway to provide more power to the air flow passing through the multiple filters. In addition, the filters are arranged in increasing resistance to air flow from the intake to the outlet so that air passing through the filters has the gross particles removed from the air stream before finer particles are trapped and removed. In one embodiment, a final filter is provided of a type that traps extremely small particles of dirt so that the outlet air is extremely clean. One or more of the filters may involve the use of purification media that removes odors, hydrocarbons and other noxious elements from the air. Outside and inside air temperatures are blended in the air passageway to aid in temperature control.

Another unique feature of this invention is the location of the air filtration system in the rear of the vehicle interior and in an area generally not used by the operator for storage, passenger placement or other such volumetric-loaded activity. In other words, the air filtration and purification system of this invention is generally mounted in a locale within the vehicle's interior that would remain empty if not used to house this system. From this design, then, no decrease is made in the size of the passenger compartment or in the size of storage and carry compartments, so that the overall efficiency of the vehicle for transporting persons and goods is not impacted.

The invention comprises an outside air intake and an inside air intake both emptying into a common plenum. An air passageway, lined with noise insulation, defined by an inlet connected to the plenum and an outlet spaced-apart therefrom is provided and contains a plurality of purifying air filters arranged in series in the passageway. A first air movement means in the form of a circulating fan is interpositioned the plenum and the passageway inlet to introduce a flow of outside and inside air from the air intakes to the filters. Wherein the outside and inside air temperatures are blended. A second air movement means preferably in the form of a motor-driven air blower, is provided at the outlet of the passageway to draw the flow of air through the filters. A vent is provided over the second air-movement means to convey the fresh and purified air back into the vehicle's interior. This reintroduction of air into the vehicle is done at a pressure slightly above ambient to provide a slight positive air pressure within the vehicle. This positive air pressure blocks the entrance of dirt and dust from outside air into the interior of the vehicle and helps maintain the overall cleanliness of the vehicle interior.

Accordingly, it is the main object of this invention to provide a bolt-on air filtration and purification system that can be easily mounted in a motorized vehicle, such as an automobile, for providing a continuous flow of fresh, purified air to the interior of the vehicle. Other objects of the invention include a means of filtering air through a series of filters placed in series in a confining air passageway such that the air flow is energized at both ends of the passageway to provide more power to pull air through the inlet scoop.

Another object of the invention is a method of capturing outside air and bringing it into the air filtration system by means of an intake device that may be mechanically added onto a vehicle without damage being done to the cosmetic and aesthetic features thereof.

Another object of the invention is a method of providing a continuous flow of filtered and purified outside and inside air to the interior of a vehicle such as to result in a slight positive pressure interior the vehicle that prevents the entrance of dirt and dust through cracks and other openings in the vehicle exterior so as to maintain a clean environment within the confines of the vehicle.

Still another object of the invention is an air filtration and purification system for the interior of a vehicle that may be added to the vehicle at any time after its manufacture by simple and straight forward installation instructions that require a noticeable reduction in the ability of the mechanic so that the system may be installed using a larger portion of the work force having less education and training than often is required in the installation of more esoteric and higher developed systems.

These and other objects of the invention may be gleaned from a review of the following description of the preferred embodiment taken together with the drawings appended hereto. The protection sought by the inventor may be gleaned from a fair reading of the claims that conclude this specification.

DESCRIPTION OF THE DRAWINGS

FIG. 2 is a general illustrative view of the top rear of an automobile showing the outside air intake and inside air intake as well as placement of the vent means for distributing the purified, filtered air into the vehicle;

FIG. 3 is a close-up view of the preferred embodiment of the outside air intake of this invention; and, FIG. 4 is a typical wiring diagram for the air movement means in this invention.

DESCRIPTION OF THE PREFERRED EMBODIMENTS

Figure 1:
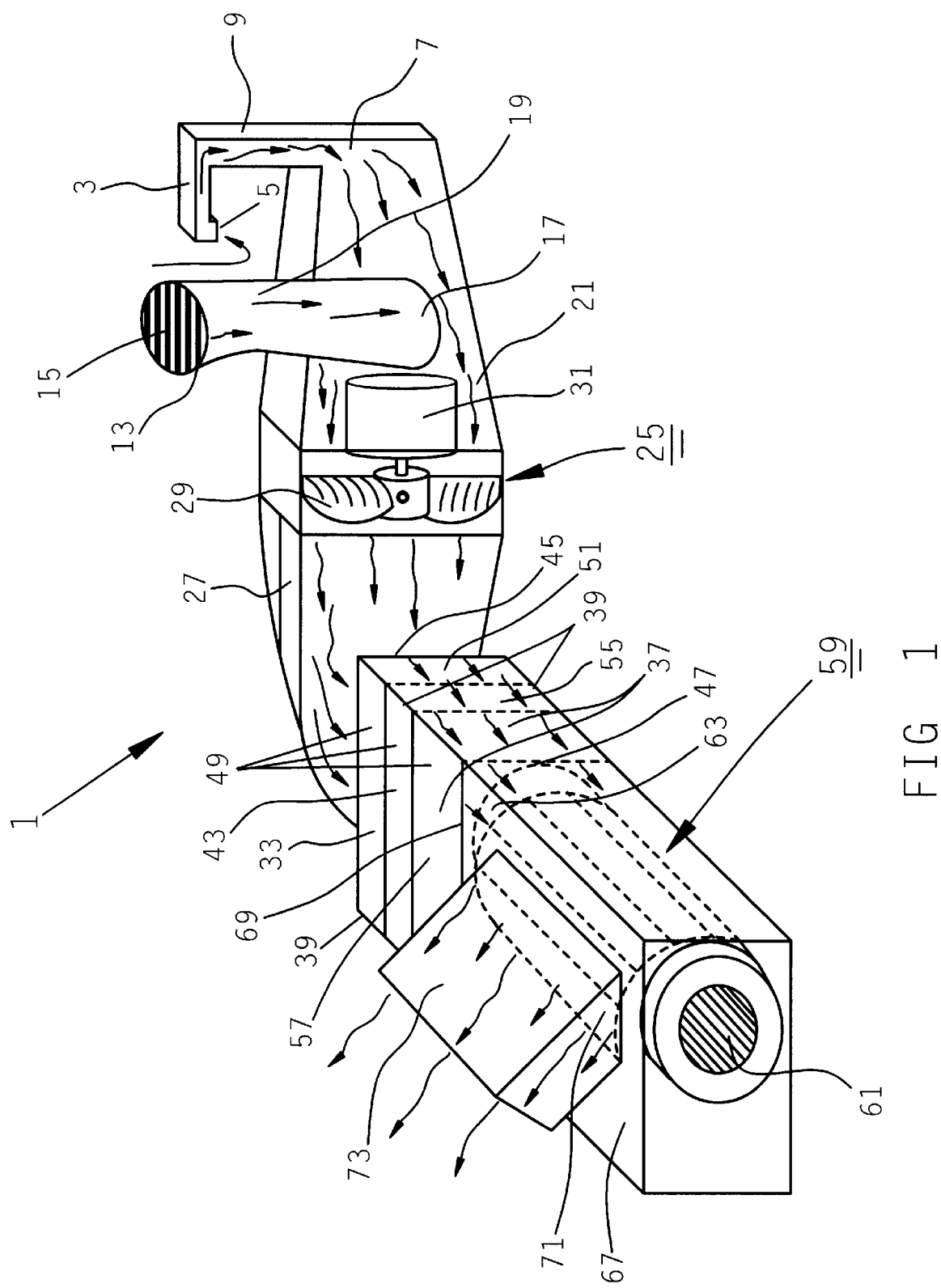
FIG. 1 is an illustrative view of the overall air filtration and purification system of this invention.

Turning now to the drawings where elements are identified with numerals and like elements are identified with like numerals throughout the three drawings, the invention 1 is shown in FIG. 1 to comprise an outside air intake 3 defined by an outer end 5 and spaced-apart inner end 7 and including a passageway 9 passing therebetween for conveying outside air into invention 1. An inside air intake 13 is provided, preferably separated from outside air intake 3 and is also defined by an outer end 15 and spaced-apart inner end 17 and including a sound damping passageway 19 passing therebetween for conveying inside air into invention 1. Outside air intake inner end 7 and inside air intake inner end 17 terminate in a common plenum 21 that is of sufficient size to allow a certain amount of mixing of the separate air flows. It is preferred that plenum 21 be greater in overall surface area than the sizes of intake inner ends 7 and 17 and further that intake inner ends 7 and 17 enter plenum 21 at different locations to allow for thorough mixing of the separate air streams before sending on through the system.

A first air movement means 25 is housed in a duct 27 that extends out of plenum 21 for starting a flow of air, indicated by arrows, comprising outside air and inside air out of said plenum. The preferred form of means 25 is a fan 29 powered by an electric motor 31, as shown in FIG. 1, run by current from the vehicle battery.

Duct 27 conveys said flow of air to a filter housing 33. Filter housing 33 comprises enclosed housing walls 37 that meet along their marginal edges 39 to form a duct-shaped element 43 that is located in series or axial air flow with duct 27 and is further defines by an inlet 45 and an outlet 47 spaced-apart therefrom.

A plurality of purifying air filters 49 is arranged in series in element 43 and is in contact with all the housing walls 37 so as to force the air to flow in inlet 45 from fan 29 through the filters to out outlet 47. It is preferred that plurality of filters 45 comprise a pre-filter or coarse filter 51 placed in series with an activated charcoal filter 55 and further in series with an ultra-fine filter 57.

A second air movement means 59 is provided in outlet 47 of said duct-shaped element 43 to draw said flow of air through said filters and pass it on to the interior of the vehicle. The preferred form of second air movement means 59 is a squirrel-cage blower 61 powered by a second electric motor 63 that is powered by the battery in the vehicle. Typically, said blower 61 is contained in a closed housing 67 that surrounds said blower and accepts incoming air through an inlet 69 connected to outlet 47 of duct-shaped element 43.

Electric motor 63 turns squirrel-cage blower 61 and draws in air that has passed through filters 49. By providing an air movement means both before and after the filters, the power given the air during its flow helps overcome the resistance of the filters.

Equally important, is a vent 71 cut in closed housing 67 to allow escape of filtered air that is under power from second air movement means 59 and a duct 73 extending from vent 71 to disperse said filtered air in a controlled manner.

It is preferred that outside air intake 3 and inside air intake 13 are separate. As shown in FIG. 2, outside air intake 3 is preferably located in the junction 75 where the upper marginal edge 79 of the vehicle trunk lid fits adjacent the body of the vehicle. This is just aft of the rear window 81 on many vehicles. The inside air intake 13 is shown in FIG. 2 to be located in the parcel shelf 83 inside rear window 81.

Coarse filter 51 is preferably a filter containing a pad of non-woven threads mashed together to provide a means of catching large pieces of dirt, soot and other gross pollutants. Activated charcoal filter 55 is preferably a filter containing a media for holding pieces of the charcoal so that the passing air stream will give up its hydrocarbons, odors, and other noxious gasses. Ultra-fine filter 57 is preferably a HEPA filter that is of such a small pore size as to remove 99.98 per cent of particulate pollutants from the air stream before it re-enters the vehicle interior. Filter 55 is sloped as shown at an angle so that when the carbon particles settle there will not be an opening at the top of the filter to allow unfiltered air to penetrate the opening.

A novel air scoop 85 is shown in FIGS. 1 and 3 attached to outer end 5 of outside air intake 3 and comprises a pair of wide vertical walls 87, set in close but spaced-apart arrangement, terminated by opposed, spaced-apart narrow side walls 91 extending between said vertical walls, said vertical walls 87 and side walls 91 arranged to pass upward from inside the trunk of the vehicle through upper marginal junction edge 75 between the elastomeric foam seals 93 located therebetween. A pair of top walls 95, also set in close spaced-apart arrangement, extend forward of vertical walls 87 and are bounded by opposed, spaced-apart narrow side walls 97 extending downward toward the trunk. Top walls 95 are arranged to pass in parallel relationship over the upper portion of the trunk and the body of the vehicle a short distance to prevent rain and snow from leaking into the trunk. A pair of front walls 99, also set in close spaced-apart arrangement, extend downward from top walls 95 toward the outer surface of the vehicle and are bounded by opposed, spaced-apart narrow side walls 103. Said close, spaced-apart walls form a narrow duct 105 that extends downward to prevent entrance of rain and snow into the scoop. Front walls 99 and side walls 103 terminate just above the surface of the rear of the vehicle so that only fresh, outside air is brought into scoop 85. Weather stripping 101 attached to trunk lid 89 prevents water from entering the trunk especially during a car wash or rain storm. Scoop 85 is of a size and shape to easily fit between the trunk seals at the top of junction 75 so that the vehicle does not have to undergo any body modification to install the invention.

All of the duct work and scoop may be made of malleable metal such as aluminum or low carbon steel metal. It may also be made of rigid plastic. The overall invention is light enough that it may be conveniently hung from under the hat shelf below the rear window. This place is usually not utilized so that the installation of the invention does not reduce the overall cargo capacity of the vehicle.

Figure 4:
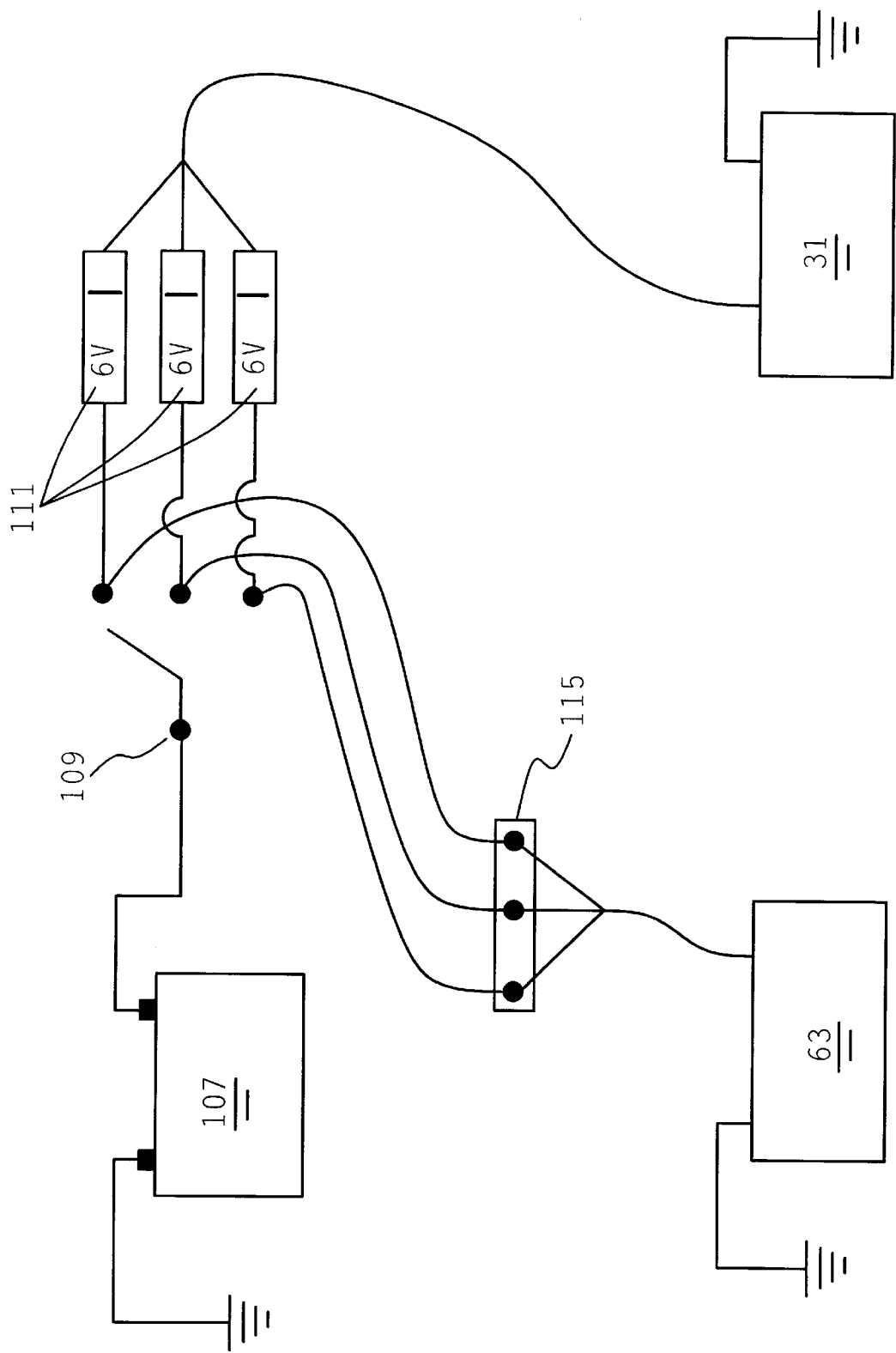

FIG. 4 shows the wiring diagram for a typical set-up of this invention. As shown, the vehicle battery 107 is grounded on one side and the other side is connected to a 3-speed switch 109. Switch 109 is connected through diodes 111 on all three outlet taps to first air movement means 25 so that said fan runs constantly at high speed on all three speeds of said second air movement means 59. This provides a constant flow of air across the air filters and preserves the momentum of the air.

Second air movement means 59 is wired between ground and a resistor 115 to provide a multiple number of speeds, such as three speeds as shown in FIG. 4.

What is claimed is:

1. An air filtration and purification system for the interior of a closed vehicle, comprising:
    a) an outside air intake and an inside air intake, both said intakes emptying into a common plenum located interior of the vehicle;
    b) an air passageway defined by an inlet, in fluid communication with said plenum, and an outlet spaced-apart therefrom for removing the air in the plenum;
    c) a plurality of purifying air filters arranged in series in said passageway;
    d) a first air movement means interposed said plenum and said passageway inlet to create a flow of air from said plenum to said filters;
    e) a second air movement means in said outlet of said passageway to draw said flow of air across said filters;
    f) vent means in fluid communication with said second air movement means for distributing said filtered air from said second air movement means into said vehicle; and,
    g) an inlet air scoop attached to the exterior of said inside air intake comprising:
        i) a pair of wide vertical walls, set in close, spaced-apart arrangement, terminated by opposed, spaced-apart narrow side walls extending between said vertical walls, said vertical walls and side walls arranged to pass upward from inside the trunk of the vehicle between the upper marginal edge of the trunk and the upper marginal edge of the vehicle body adjacent thereto and between said seals that are located along said edges into the air stream passing over the vehicle without requiring any modification to the body of the vehicle,
        ii) a pair of top walls extending forward of said vertical wall and bounded by set in close, spaced-apart arrangement, terminated by opposed spaced-apart narrow side walls extending between said top walls, arranged to pass in parallel relationship over the upper portion of the trunk and the body of the vehicle to prevent rain and snow from entering said scoop; and,
        iii) a pair of front walls, set in close, spaced-apart arrangement, extending downward from said top walls toward the outer surface of the vehicle and bounded by opposed, spaced-apart narrow side walls extending between said front walls, said front walls and said side walls terminating above the surface of the vehicle to allow fresh air to enter therein and pass therethrough into said scoop and into said inside air intake.

2. The air filtration and purification system of claim 1 wherein said outside air intake is a separate intake from said inside air intake.

3. The air filtration and purification system of claim 1 wherein said outside air intake is located at the upper perimeter of the trunk of the vehicle.

4. The air filtration and purification system of claim 1 wherein said plenum is defined by a surface area greater than the individual cross-sectional areas of said outside and said inside air intakes.

5. The air filtration and purification system of claim 1 wherein said outside air intake enters said plenum at a different location from the entrance of said inside air intake.

6. The air filtration and purification system of claim 1 wherein said purifying air filters are arranged to pass entirely across the cross-section of said passageway.

7. The air filtration and purification system of claim 1 wherein said plurality of purifying air filters includes three separate air filters.

8. The air filtration and purification system of claim 7 wherein said three filters include a coarse filter, an activated charcoal filter and an ultra-fine filter.

9. The air filtration and purification system of claim 8 wherein said coarse filter is set closest to said air passage inlet.

10. The air filtration and purification system of claim 8 wherein said ultra-fine filter is set closest to said air passage outlet.

11. The air filtration and purification system of claim 10 wherein said ultra-fine filter is a HEPA filter.

12. The air filtration and purification system of claim 1 wherein said first air movement means is an electric-powered air fan.

13. The air filtration and purification system of claim 1 wherein said second air movement means is an electric-powered, squirrel-cage air blower.

14. The air filtration and purification system of claim 1 wherein said electric-powered air, squirrel-cage blower comprises an electric motor for turning a shaft, an elongated squirrel-cage impeller fan attached to said shaft and driven by said motor, and a housing completely surrounding said squirrel-cage blower.

15. The air filtration and purification system of claim 14 wherein said vent means is formed in said housing.

16. The air filtration and purification system of claim 1 wherein said inside air intake is located in the parcel shelf under the rear window of the vehicle.

17. The air filtration and purification system of claim 1 wherein said vent is located in the parcel shelf under the rear window of the vehicle.

18. The air filtration and purification system of claim 1 further including weather stripping about said top walls to prevent the influx of water into said scoop.

19. The air filtration and purification system of claim 8 wherein said activated charcoal filter is set at an angle so that particles of charcoal will not settle during use and will maintain a filter across the entire opening thereof.

20. The air filtration and purification system of claim 1 wherein said system is located in the trunk of the vehicle.

* * * * *